Nov. 12, 1935.  J. H. COX  2,020,536
MINNOW BUCKET
Filed March 11, 1935
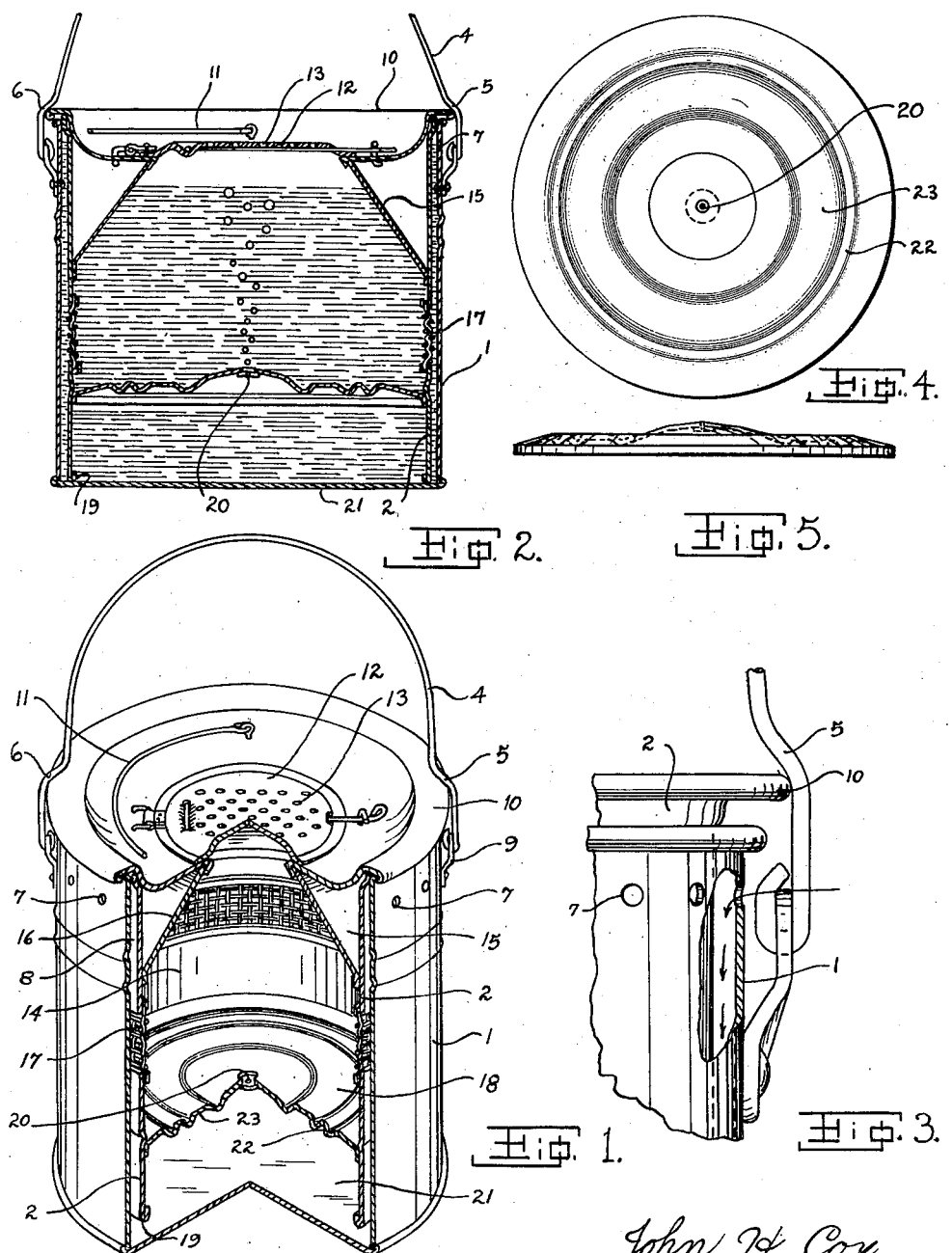

Patented Nov. 12, 1935

2,020,536

UNITED STATES PATENT OFFICE 2,020,536

MINNOW BUCKET

John H. Cox, Quincy, Ill.

Application March 11, 1935, Serial No. 10,443

5 Claims. (Cl. 43—56)

My invention relates to buckets and floats for holding fish bait and has for an object to provide an effective means of carrying and protecting minnows for bait so that the water containing the minnows may be completely and almost continuously aerated so that the minnows may be kept alive for a substantial period of time.

A further object of my invention is the provision of a novel float supported in the water in a minnow bucket in a manner permitting the weight of the float to aid in the supply of air admitted to the minnow cage of the float.

A further object of my invention is to provide in conjunction with the above mentioned features of a minnow bucket a handle therefor shaped to define a means for limiting the movement of the float without unintentionally releasing the same from the bucket containing the water in which the float is resting.

A particular purpose of my invention is to provide in a minnow bucket a float base plate shaped to define means for supplying air bubbles or releasing the same into the minnow cage almost in constant supply and particularly with the slightest agitation and in such a minnow bucket my purpose is to provide also a handle shaped to define a stop member for limiting the free movement of the float and to prevent the float from unintentionally coming out of the container.

I attain the objects of my invention in the device described in the annexed specification, recited in the claims and illustrated in the accompanying drawing in which like reference numerals indicate like parts in the several figures.

Referring to the figures:

Figure 1 is a perspective with a cut-away disclosing the details of construction of my invention.

Figure 2 is a vertical half-section of my invention.

Figure 3 is a detail of a portion of the handle and the adjacently connected portion of the minnow bucket of my invention.

Figure 4 is a bottom view of the corrugated bottom plate of the float in my minnow bucket.

Figure 5 is a side or elevation of the plate shown in Fig. 4.

With particular attention to the drawing forming a part of this specification, it will be observed that to accomplish the purposes of my invention I provide in conjunction with an outer bucket 1 a float 2 for holding minnows and the like.

This outer bucket is provided with a handle 4 for carrying the same, and one of the novel features of my invention is the shape of the handle which provides in its form an inward off-set 5 on one side and 6 on the other serving as a stop means for limiting the upward movement of float 2 and for preventing the unintentional removal of float 2 from bucket member 1.

This bucket member 1 has a series of air intake holes 7 adjacent the top for admitting air through the bucket to the water contained therein as the air first enters the space 8 between the bucket and the float.

This handle member 4 will spread when pivotally pushed down to one side on its support brackets 9 and permit off-set members 5 and 6 to slide off peripheral rim 10 when it is desired to take the float out of bucket 1.

In my minnow bucket I have provided a handle 11 for lifting float 2 and carrying the same while a perforated lid member 12 provides top access to the interior of the float while the ventilating holes 13 provide ample ventilation for the minnow cage portion 14 of float 2.

I have provided as an essential feature of my invention a float chamber 15 which is air-tight and defined by an annular collar 16 fixed in its relation to float 2, and when it is desired to take float 2 out of bucket 1 and let it float in the waters of the fishing pool, pond, river or the like, then this air-tight chamber 15 will permit the float 2 to rest in the water with only a small portion of the float adjacent the top exposed above the water.

When the minnows are put into the float cage through lid 12 there is preferably provided for the minnow chamber 14 a wire cage section 17 of the minnow cage wall defining the outer perimeter portion of float 2 and this wire cage section in float 2 provides a greater freedom of movement of water and ventilation in and out of the minnow cage chamber 14.

I have in float 2 a particularly meritorious feature adapted in its function to aid very materially in supplying air for the minnows in chamber 14.

This feature of merit is found in base plate 18 which is fixed into float 2 into a position a substantial distance above bottom 19 of the float periphery, and in view of its peculiar shape this base plate in its location serves several purposes.

For instance, plate 18 forms the bottom of minnow cage chamber 14 and has a minute central hole 20 through which small bubbles of air are permitted to escape from a lower water pressure chamber 21 up into and through the minnow cage chamber 14 and since the bottom end of float 2 is open like an inverted cup it will be evident that when float 2 is seated down into bucket 1 full of water the weight of the float settling into the water would produce a vacuum in pressure chamber 21 were it not for central aperture 20 releasing the air slowly in minute particles out of this chamber up through the water in minnow cage chamber 14. This gradual release of air from chamber 21 helps to keep the minnows fresh and alive but as such air escapes from this chamber 21 slowly it will just as slowly let into this chamber an equal amount of water to take its place.

Thus this replacement of water for the air will ultimately fill chamber 21 with water up to the bottom of plate 18.

Plate 18 however, is shaped to define a central air receiving dome or pocket from which the air leaves as it enters chamber 14 and also is shaped to define a series of concentric corrugations thus forming spaced rings or channels extending slightly down into chamber 21 and by such formation these corrugations 22 set off a series of spaced air traps 23 under plate 18, all of which are filled with air under pressure due to the weight of the float 2 upon the water in chamber 21. This fact is a distinct advantage in accomplishing the purposes of my invention.

For instance, even after chamber 21 is practically filled with water admitted by the slow escape of air therefrom a careful study of the drawing will reveal the fact that the spaced annular air traps 23 contain each a supply layer from which air may escape toward aperture 20 upon the slightest agitation of bucket 1 or float 2 with the result that there is provided for aeration of minnow cage 14 virtually an inexhaustible supply of air for bait minnows and the like.

When float 2 is shoved into bucket 1 the rising column of water outside of float 2 within bucket 1 forces air out through holes 7 and were it not for off-sets 5 and 6 in handle 4 adapted to hold float 2 down within predetermined limits then the air pressure in chamber 21 would tend to hold float 2 too high in bucket 1.

The salient features of my invention have thus been set forth and the practical character of my invention has been proven by experience under actual tests and the proven fact is that with a minnow bucket of my invention possessing the merits above described may be carried in a car or boat or other conveyance for extended periods of time with every assurance that the minnows will be well supplied with air in ample quantities with the agitation commonly expected when such bait buckets are being transported.

In a careful study of the drawing it will be observed that when float 2 rests upon the water in bucket 1 that the very fact that it is floating will produce a tendency for float 2 to rock in the water and this rocking motion is a very desirable and effective way to almost continually replenish the supply of air to the minnow cage of the float. This rocking motion of float 2 on the water in bucket 1 therefore creates a sort of breather action in pulling in new supplies of air into the bucket through holes 7 or over the top of the bucket 1.

Attention is especially directed to the merits in the construction of plate 18 which during the slightest agitation of bucket 1 or float 2 will cause air traps 23 to give up on such agitation a limited supply of the air pressed up into these traps.

It will be particularly noted that the off-sets 5 and 6 of handle 4 on bucket 1 do not press down tightly on the top rim 10 of float 2, but instead they allow a sufficient vertical movement of float 2 to give the float ample room for a rocking motion as it floats in the water in bucket 1. With this tendency to rock as it floats there will continue to be a tendency for the necessary agitation to release return supplies of air from air traps 23.

Having thus described the nature of my invention what I claim is:

1. In a bait bucket, a water container, a bait cage float in the container, a cover secured to the float and adapted to form a closure for the container, and a handle having an offset portion adapted to engage the edge of the cover to retain the float within the container and limit the movement thereof, said float having a bottom plate spaced at all points above the bottom of the container and provided with a central air escape hole, and a plurality of concentric corrugations to define annular air traps beneath the bottom plate, and said water container being provided with air intake apertures in the wall thereof adjacent said cover.

2. A combination container, float and cover for bait which includes an upright container apertured adjacent its upper edge, an apertured cover secured to the float, a handle having offset portions, said handle being pivoted to the container, whereby movement of the handle to an upright position will cause the offset portions thereof to engage and maintain the cover to prevent opening thereof beyond predetermined limits, said float having a bottom plate formed with a plurality of recesses, and an aperture at the center of the plate, the recesses constituting air pockets when the float is positioned in the container, said bottom plate being spaced from said float bottom periphery and said container bottom at all points.

3. In a bait bucket, a water container, a bait cage float in the container, a cover secured to the float and adapted to form a closure for the container, and a handle having an offset portion adapted to engage the edge of the cover to retain the float within the container and limit the movement thereof, said float having a bottom plate spaced at all points above the bottom periphery thereof and above the container bottom, and provided with a central air escape hole, said bottom plate shaped to define a central inverted dish-like cavity portion and a plurality of annular recesses encompassing said inverted dish-like portion which has a greater depth than is provided in said annular recesses, said central portion and said annular recesses defining air traps below said bottom plate, and said water container being provided with air intake apertures in the wall thereof adjacent said cover.

4. A minnow bucket comprising an outside water container with spaced perforations adjacent the top thereof a handle pivotally secured to the container and having offsets therein, a float and minnow cage provided with a screened wall portion and a cover having an annular extension covering the top periphery of said container and engaged by said offsets of said handle, a perforated closure centrally disposed in said cover and an annular inner wall secured to said cover and to the upright walls of the float in a manner defining an annular air-tight chamber for the float; a bottom plate for the float spaced at all points above the bottom periphery thereof and above the bottom of said container, said bottom plate being provided with a central air escape hole and shaped to define a central inverted dish-like cavity portion and a plurality of annular corrugations forming recesses surrounding said inverted dish-like portion which has a greater depth than is provided in the said annular recesses, said central portion and said annular recesses defining air traps below said bottom plate.

5. In a minnow bucket having an outside water container with spaced perforations adjacent the top thereof, a handle pivotally secured to the container and having offsets therein, a float and minnow cage provided with a screened wall portion and a cover having an annular extension covering the top periphery of said container and engaged by said offsets of said handle, a perforated closure centrally disposed in said cover and an annular inner wall secured to said cover and to the upright walls of the float in a manner defining an annular air-tight chamber for the float; a bottom plate for the float spaced at all points above the bottom periphery thereof, and above the bottom of said container, said bottom plate being provided with a central air escape hole and shaped to define a central inverted dish like cavity portion and a plurality of annular recesses encompassing said inverted dish-like portion which has a greater depth than is provided in said annular recesses, said central portion and said annular recesses defining air traps below said bottom plate.

JOHN H. COX.